Figure 1:
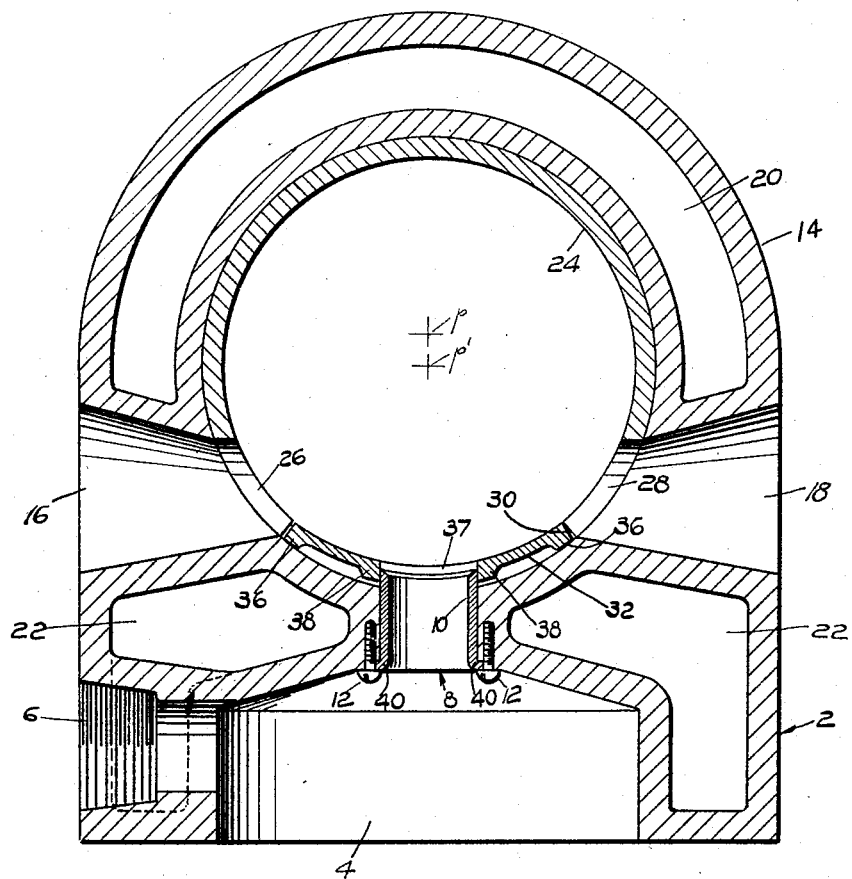

Jan 6, 1931.     R. WEHR     1,787,649
INTERNAL COMBUSTION ENGINE
Filed Sept. 4, 1929    2 Sheets-Sheet 1

Jan 6, 1931. R. WEHR 1,787,649
INTERNAL COMBUSTION ENGINE
Filed Sept. 4, 1929 2 Sheets-Sheet 2
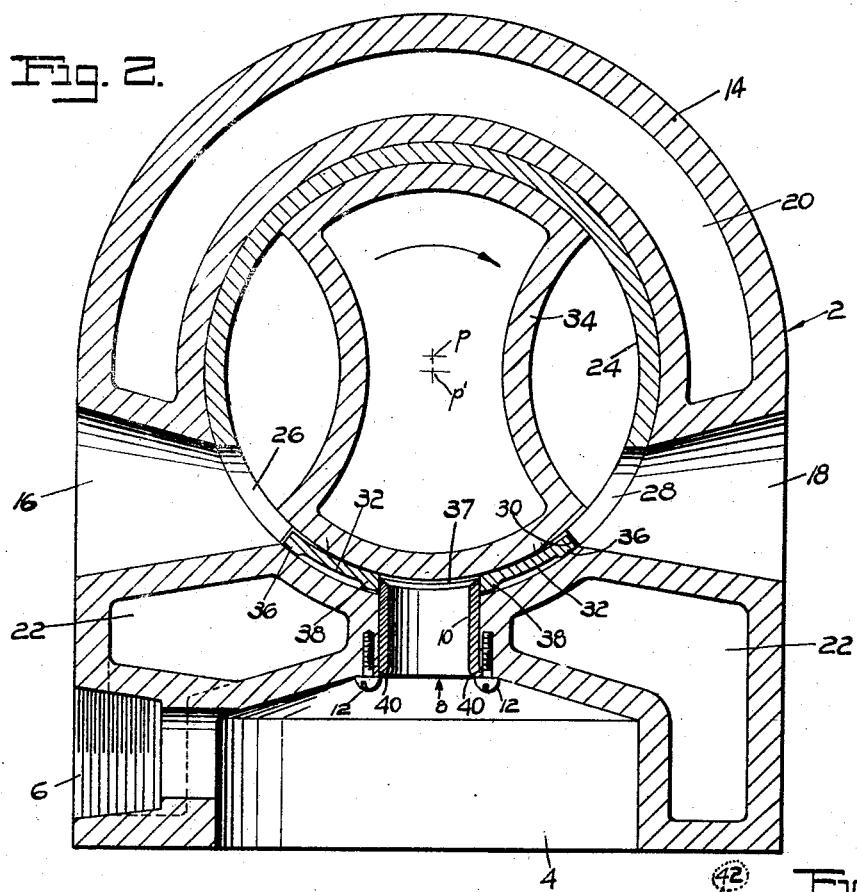
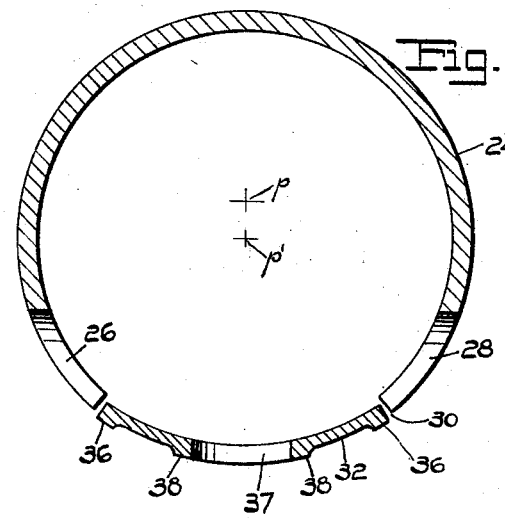
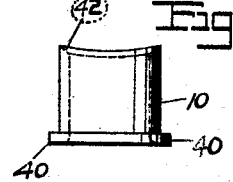
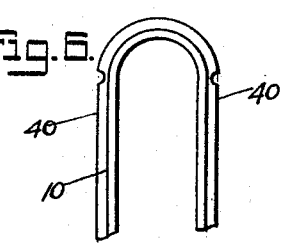

Patented Jan. 6, 1931

1,787,649

UNITED STATES PATENT OFFICE

RUDOLPH WEHR, OF LOS ANGELES, CALIFORNIA, ASSIGNOR TO THE WEHR MOTOR COMPANY, A CORPORATION OF CALIFORNIA

INTERNAL-COMBUSTION ENGINE

Application filed September 4, 1929. Serial No. 390,284.

My invention relates to packing devices or bearing devices for moving parts, and more particularly to devices for packing the rotary valves of internal combustion engines and insuring that said valves will at all times be effectively packed to prevent leakage under all conditions of operation, and at all temperatures to which said valves are subjected.

It accordingly is an object of my invention to provide a novel form of packing or bearing device, inherently flexible or resilient in nature, which device is capable of movement, responsive to the varying temperature conditions of a rotary member with which said device is adapted to be associated.

A further object of my invention is to provide a novel form of packing shoe, adapted for special use in connection with the rotary valves of internal combustion engines, said shoe being eccentrically positioned with respect to the valve casing, prior to the positioning of the valve therein, but after said valve has been inserted within said casing, said shoe will at all times embrace said valve and have certain portions thereof concentric with said valve, thus continually affording a running tight fit with said valve to prevent leakage, the inherent resiliency or flexibility of said shoe always automatically adjusting said shoe to the radius of said valve.

It is also an object of my invention to provide a novel form of combined leakage preventing and carbon removing device, preferably in the shape of a sleeve, relatively movable with respect to the packing shoe, or secured to said shoe and relatively movable with respect to the cylinder port of the engine, said member or sleeve having a cutting edge whereby, during any relative movement of said shoe and sleeve any accumulated carbon may be effectively removed, said sleeve being adapted to form the compression chamber of the engine, and also effectively prevent leakage about said shoe.

The above, and further objects and advantages of my invention, as will hereinafter more fully appear, I attain by the construction described in the specification and illustrated in preferred form on the drawings, forming a part of my application.

Figure 4:
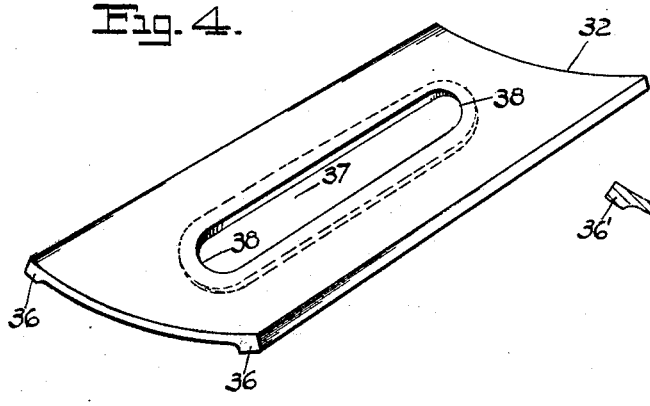
Figure 7:
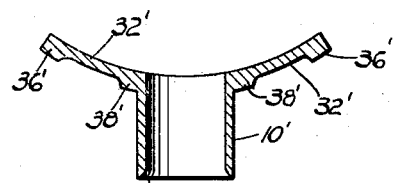

Reference is had to the accompanying drawings, in which similar reference characters denote similar parts. In the drawings;

Fig. 1 is a fragmentary cross-sectional view of one form of my invention, illustrating the parts before the valve is positioned therein, Fig. 2 is a similar view illustrating the position the parts assume when the valve is in position, Fig. 3 is a transverse cross-sectional view through the liner and packing shoe, showing the position before they are placed in the valve casing, Fig. 4 is an enlarged perspective view of the packing shoe, Fig. 5 is an elevational view of the combined packing sleeve and carbon removing member, Fig. 6 is a fragmentary, top plan view of Fig. 5, and Fig. 7 is a cross-sectional view of a modified form of shoe and sleeve.

Describing my invention more in detail, in its broader aspects, said invention comprises a bearing member or packing shoe, adapted for special use in connection with internal combustion engines, said member or shoe having an inherent flexibility, or resiliency, and when associated with the valve casing of a rotary valve is eccentrically positioned with respect to the aperture therein, the valve, when positioned within the casing, being adapted to bear on said member or shoe, so certain portions thereof will be concentric with said valve to form a bearing surface therefor, and at all times to maintain a running tight fit therewith, to prevent leakage, the inherent resiliency or flexibility of said member or shoe continually maintaining such a fit, irrespective of wear or temperature changes of the valve.

Said member or shoe is preferably used with a sectional or cut-away liner, embracing the valve within the valve casing, said member or shoe being capable of a radial movement within the cut-away portion of said liner, although it is to be distinctly understood that, if desired, said liner may be omitted.

To form the compression chamber of the motor, to prevent leakage about the shoe, and to cut off or remove any accumulations of carbon, I provide a sleeve, preferably formed with an upper cutting edge, to cut the carbon, said shoe being preferably relatively movable with respect to said sleeve although said shoe and sleeve may be secured to each other and move relatively with respect to the cylinder port of the engine.

More specifically, my invention comprises an internal combustion engine 2, either of the two-cycle or four-cycle, or any other type, the cylinders 4 of which are provided with the usual spark plug openings 6, and the cylinder port 8, in which the compression chamber member or sleeve 10 is preferably anchored by any desired means as, for example, the screw bolts 12.

The valve casing 14 is provided with the usual inlet port 16 and exhaust port 18, and cooling channels 20 connected to the cylinder cooling channels 22, and positioned within said valve casing, and concentric therewith, is the sectional or cut-away liner 24, having inlet apertures 26, and exhaust apertures 28, said liner being cut out or cut away as at 30 for the reception of the bearing member or packing shoe 32, which shoe fits loosely within said cut-away portion so said shoe may have a movement therein.

The bearing device or shoe 32 is arcuate in form, and has its inner surface struck radially from a suitable point such as $p$ (Figs. 1 and 2), the outer periphery of the liner 24 being struck with the same radius, but from the point $p'$, thus positioning said shoe eccentrically with respect to said liner, said shoe being positioned substantially as shown in Fig. 1, prior to the insertion of the valve 34 therein.

The shoe 32 may be constructed of suitable material, either the same as that of the valve 34, or of different material, as in practice preferred, but must have an inherent resiliency or flexibility, so that it will expand and contract and move radially with the valve 34 to maintain at all times a running fit with said valve; which valve, when positioned within the liner 24, will cause said shoe to have parts of its inner surface concentric with the outer periphery of said valve for said purpose, to effectively prevent leakage.

The shoe 32 is provided with ribs or enlargements 36, which ribs, when the shoe is in the position depicted in Fig. 1, will rest on the valve casing, and, as shown in Fig. 2, when the valve 34 is positioned within the liner 24, said ribs will also rest on said valve casing, forming resting points so that the intermediate parts of said shoe may by reason of its inherent flexibility or resiliency move with the valve 34 as it expands, contracts or wears, to pack said valve, the outer end portions of said shoe having a slight clearance (Fig. 2) between said valve, there being thus always maintained a running tight fit between the valve and shoe from the sleeve 10, outwardly, so that all wear and expansion and contraction of the valve 34 may be compensated for at all times.

The shoe 32 is also provided with an opening or aperture 37, in which the wall of the sleeve 10 is positioned, and which provides for a relative movement between the shoe 32 and said sleeve, said opening or aperture being surrounded by a boss 38, which boss is always free from the valve casing 14, although the ribs or enlargements 36 are continually in contact with said casing when the valve 34 is positioned therein, so that the flexibility or resiliency of said shoe will continually, and under all running conditions of the engine, urge said shoe to said valve, providing an exceedingly simple, effective and efficient means for packing said valve against leakage, and compensating for wear and temperature changes of said valve.

If desired, the sleeve 10 may be provided with a flange 40 whereby it may be detachably associated with the cylinder port 8 of the engine by means of the securing devices 12. Moreover, the upper portion of said sleeve may be beveled as at 42 to provide a cutting edge, whereby, as the shoe 32 moves relatively to said sleeve, any carbon accumulations may be cut.

If desired, the sleeve 10 may be secured to or integrally associated with the shoe 32, so both the shoe and the sleeve may move relatively to the cylinder port 8. Such a construction is shown in Fig. 7, where the shoe 32' with ribs or enlargements 36' has secured to or integral therewith the sleeve 10' provided with the carbon cutting means 42', which sleeve is surrounded by the boss 38' as in the other form of my invention.

In operation, the liner 24 is placed in the valve casing 14, and the shoe 32 placed over the sleeve 10, which has its upper cutting edge positioned at all times within the confines of the aperture 37, and never projects beyond the inner surface of said shoe, the movement of said shoe being very slight. The various parts will then be positioned as in Fig. 1, illustrating the eccentricity of the shoe 32.

The valve 34 is then positioned within the liner 24. This depresses slightly the shoe 32, so that the parts in the region of the cylinder port 8 (and sleeve 10) will be concentric with the valve 34, the remaining parts of said shoe being eccentric to the end that a wear surface is provided, the shoe by its inherent flexibility or resiliency being continually urged toward the periphery of the valve 34, the boss 38 being at all times out of engagement with the valve casing. (See Fig. 2.) This permits a running tight fit, and prevents leakage, notwithstanding the slight wear and temperature changes of the valve. The sleeve 10, in which the explosive mixture is compressed, prevents any leakage around the shoe 32 below the bottom thereof. As the shoe 32 moves toward and away from the valve 34, the portion 42 cuts any carbon that may be accumulated.

As seen in Figs. 1 and 2, the shoe 32 is slightly smaller than the cut-out or gap in the liner 24, which by the rotation of the valve 34 in one or the other direction is caused to abut against one side or the other of the shoe and thus forms a leak-proof joint therebetween, without interfering with the action of the shoe, which as hereinbefore stated, due to its inherent resiliency, remains in snug contact with the valve, regardless of its diametrical variation.

It will thus be seen that I have provided a simple, inexpensive, and remarkably efficient means for packing a rotary surface.

While I have thus described my invention with great particularity, it will be clear that the same may be modified throughout a wide range. I accordingly do not propose to be limited to the exact details of construction as shown and described, but reserve the right in practice to make any and all modifications thereof that fall within the scope of the appended claims.

I claim as my invention:

1. In combination, a casing having an aperture, a rotary member within said aperture, and a member having its major portion engaging with the periphery of said rotary member and adapted by its inherent flexibility to move radially therewith to maintain a running fit under varying temperature conditions of said rotary member.

2. In combination, a valve casing having an aperture, a rotary valve within said aperture, a portion of the peripheral wall of said aperture being cut away, and a member positioned within said cut away portion, said member having its major surface contacting the valve and by its inherent flexibility being movable radially with said valve and relatively to said casing.

3. A valve casing having an aperture, a liner in said aperture, said liner having a cut-away portion, and a member in said cut-away portion, said member being adapted to embrace the periphery of a rotary valve by its inherent flexibility when positioned therein and be moved radially by said valve in said cut-away portion to form a bearing therefor.

4. An internal combustion engine having a port, a rotary valve for controlling said port, and a perforated valve casing member juxtaposed to said port, said member having an inherent flexibility and being adapted to respond to temperature changes of said valve and move radially therewith, and at all times maintain a running fit with said valve on both sides of said port.

5. An internal combustion engine having a port, a rotary valve, and an inherently flexible packing shoe positioned over said port and engaging said valve, said shoe being adapted to move radially with said valve upon a variation of temperature changes of said valve.

6. An internal combustion engine having a port, an inherently flexible packing shoe positioned over said port, and means associated with said port and said shoe for cutting any carbon that may accumulate in said port.

7. An internal combustion engine having a port, a rotary valve for controlling said port, and a pair of inter-connected relatively movable members associated with said port adapted to respond to temperature changes in said valve.

8. An arcuate packing shoe adapted for special use in connection with the rotary valve of an internal combustion engine, said shoe having an opening therein, a boss surrounding said opening and a rib on each end of said shoe.

9. A valve casing having an aperture, a valve adapted to rotate therein, a liner between said valve and casing, said liner having a detached inherently yielding portion freely supported at its ends by said casing.

10. In a device of the character disclosed, a valve casing having a port therein, a liner in said casing having a gap, a valve adapted to rotate in said liner, a plate spanning the gap in said liner and supported at its sides upon said casing so that a substantial portion thereof exerts a yielding pressure against said valve, said plate having centrally thereof a port, and means extending into said port to prevent circumferential movement of said plate and to remove deposits of carbon.

11. In a device of the character disclosed, a valve casing having a port therein, a liner in said casing having a cut-out portion, a valve adapted to rotate in said liner, and a spring member disposed in the cutout portion of said liner and adapted to conform to said valve and any diametrical variation thereof, and move radially therewith said spring member having a port registering with the port in said valve casing.

12. In a device of the character disclosed, a valve casing having a port therein, a liner in said casing having a cut-out portion, a valve adapted to rotate in said liner, a spring member disposed in the cut-out portion of said liner with a slack fit and having a radially yielding contact with the valve throughout the major portion of its latitudinal extent, said member having a port registering with the port in said casing, and means associated with said spring member to prevent circumferential movement thereof.

In testimony whereof I have signed my name to this sepecification.

RUDOLPH WEHR.